United States Patent [19]

Durling

[11] 4,191,428

[45] * Mar. 4, 1980

[54] AIR BRAKE SYSTEM WITH PRESSURE HOLDING VALVE

[75] Inventor: Harold Durling, Elsie, Mich.

[73] Assignee: Midland-Ross Corporation, Cleveland, Ohio

[*] Notice: The portion of the term of this patent subsequent to Aug. 10, 1995, has been disclaimed.

[21] Appl. No.: 928,737

[22] Filed: Jul. 28, 1978

Related U.S. Application Data

[63] Continuation-in-part of Ser. No. 769,548, Feb. 17, 1977, Pat. No. 4,119,351.

[51] Int. Cl.² .............................................. B60T 15/20
[52] U.S. Cl. .............................. 303/6 M; 137/516.27; 303/9; 303/84 R
[58] Field of Search .................. 137/512.2, 513, 513.3, 137/513.7, 516.25, 516.27; 188/170; 303/6 M, 7, 9, 40, 69, 84 R, 84 A

[56] References Cited

U.S. PATENT DOCUMENTS 3,387,623   6/1968   Essig .......................... 137/516.27 X Primary Examiner—Duane A. Reger
Attorney, Agent, or Firm—H. Duane Switzer

[57] ABSTRACT

A vehicle air brake system includes spring set air released parking brakes to which air is supplied through a pressure holding valve which maintains the air chambers of the parking brakes at a predetermined pressure even though the air brake system may be at operating pressures substantially lower than the predetermined pressure. When the air pressure in the air brake system falls below operational levels, the pressure holding valve responds to release the air from the parking brake chambers. The pressure holding valve is operative to exhaust the parking brake chambers to substantially zero pressure, and is also operative to charge the parking brake chambers any time the input pressure is above zero and exceeds the pressure in the parking brake chambers.

7 Claims, 5 Drawing Figures

AIR BRAKE SYSTEM WITH PRESSURE HOLDING VALVE

BACKGROUND OF THE INVENTION

This application is a Continuation-In-Part of copending application Ser. No. 769,548 filed Feb. 17, 1977, and now U.S. Pat. No. 4,119,351 issued Oct. 10, 1978.

This application relates to the art of vehicle air brake systems and valves used therein. More specifically, the invention relates to an improved pressure holding valve for maintaining spring set parking brakes in a released condition even though the air brake system is at relatively low operating pressures. Although the improved pressure holding valve of the present application is particularly applicable for use in an air brake system and will be described with reference thereto, it will be appreciated that the valve can be used in other systems where it is desired to prevent backflow until a predetermined pressure differential develops.

Known vehicle air brake systems include spring set air released parking brakes. One system including a parking brake of this type is disclosed in U.S. Pat. No. 3,285,672 issued Nov. 15, 1966, to Avrea. In systems of this type, release of the parking brakes requires a predetermined pressure of around 80 psig. The air brake system itself is normally operated at a pressure of around 125 psig. During stop and go driving or other heavy brake usage periods, it is possible for the air supply to be depleted faster than the compressor can recharge it. Therefore, the brake system may be at operational pressures between 30-80 psig where the vehicle service brakes can still be operated. At these relatively low operational pressures, the air in the parking brakes would normally bleed down to the same operational pressure. When the air in the parking brakes is at a pressure less than 80 psig, the parking brake is partially applied. As the air pressure is further depleted, the parking brake is applied with greater force under the spring bias. It would be desirable to have a system in which the parking brakes would not drag at relatively low operational pressures of the air brake system.

One prior type of valve which allows flow therethrough in both directions is disclosed in U.S. Pat. No. 3,439,873 issued Apr. 22, 1969, to Relf. The valve is spring loaded and would not be capable of exhausting parking brake chambers to substantially zero pressure.

SUMMARY OF THE INVENTION

An air brake system of the type described includes a pressure holding valve between the air supply and the parking brakes to maintain a predetermined pressure in the parking brake air chambers to hold same released when the air brake system is at operational pressures below the predetermined pressure. This prevents dragging of the parking brakes when the air brake system is at operational pressures below the minimum predetermined pressure required to hold the parking brakes completely released. When the air pressure in the air brake system falls below operational pressure levels, the pressure holding valve is operative to exhaust air from the parking brake air chambers.

In one arrangement, the pressure holding valve is incorporated in a common valve body with a quick release valve device for releasing pressure from the parking brake air chambers to atmosphere.

The pressure holding valve includes air inlet and delivery ports, and is operative to provide flow therethrough from the inlet port to the delivery port when there is a pressure drop from the inlet port to the delivery port. The pressure holding valve is operative to block flow therethrough from the delivery port to the inlet port when there is a relatively low pressure drop from the delivery port to the inlet port. When there is a relatively high pressure drop from the delivery port to the inlet port, the pressure holding valve is operative to provide flow therethrough from the delivery port to the inlet port.

In one arrangement, a check valve is interposed between the inlet and delivery ports, and movable pressure responsive means is located between the inlet and delivery ports for providing flow past the check valve from the delivery port to the inlet port in response to high pressure drop from the delivery port to the inlet port. The pressure responsive means may comprise a hollow piston having one end normally engaging the check valve which is yieldably biased against one piston end. The piston is responsive to a high pressure drop from the delivery port to the inlet port for moving away from the check valve.

It is a principal object of the present invention to provide an improved vehicle air brake system having a pressure holding valve for holding parking brakes disengaged at relatively low system pressures.

It is an additional object of the invention to provide an improved pressure holding valve.

It is also an object of the invention to provide an improved pressure holding valve combined with a quick release valve device.

It is a further object of the invention to provide an air brake system having valve means for preventing dragging of the parking brakes even though the system may be at relatively low operational pressures.

DESCRIPTION OF A PREFERRED EMBODIMENT

Figure 1:
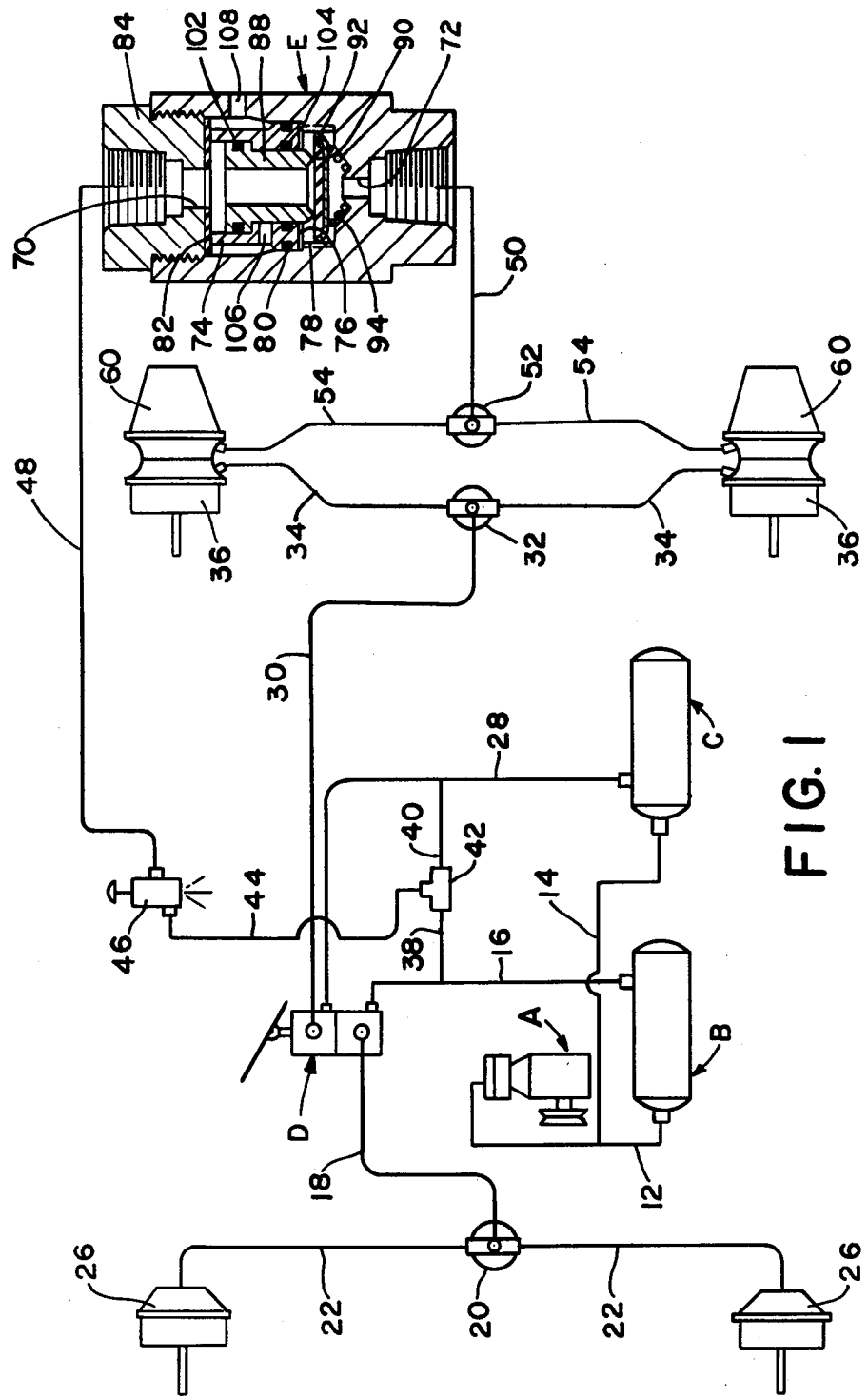
FIG. 1 is a schematic illustration of a vehicle air brake system having the improved valve of the present application incorporated therein.

With reference to the drawing, FIG. 1 is a very schematic illustration of a vehicle air brake system including an engine driven air compressor A supplying air through conduits 12 and 14 to reservoirs B and C. Reservoir B supplies air through conduit 16, treadle valve D, conduit 18, quick release valve device 20 and conduits 22 to front brake actuators 26. Reservoir C is connected by conduit 28,, treadle valve D, conduit 30, quick release valve device 32, and conduits 34 with rear brake actuators 36. Conduits 16 and 28 from reservoirs B and C are also connected by conduits 38 and 40 with a two-way check valve 42 which is connected by conduit 44 with a parking brake control valve 46. Conduit 48 connects parking brake control valve 46 with pressure holding valve E which in turn is connected through conduit 50, quick release valve device 52 and conduits 54 with parking brakes 60. Parking brakes 60 may be of the type disclosed in FIG. 2 of U.S. Pat. No. 3,285,672 issued Nov. 15, 1966, to Avrea. The parking brake is mounted coaxially with the rear brake actuators. Coil springs normally bias the parking brakes to an engaged position, and air chambers are supplied with air at a predetermined pressure to overcome the spring force and hold the parking brakes in a released position.

In conventional air brake systems, there is no pressure holding valve E. Air is supplied through parking brake control valve 46 to the air chambers of the parking brakes for releasing the parking brakes. Air pressure of around 80 psig is required in the air chambers of the parking brakes for completely releasing same. In a normal system, depletion of air pressure in the reservoirs so that air pressure in conduit 44 is below 80 psig will also cause air to bleed back from the parking brake air chambers through parking brake control valve 46 into the system. This depletion of air pressure in the air chambers of the parking brakes causes an application of the parking brakes so that they drag. When it is desired to intentionally apply the parking brakes, parking brake control valve 46 is operated to close conduit 44 for protecting the air pressure in the remainder of the system while exhausting pressure in conduit 48 to atmosphere so that the air in the parking brake chambers also bleeds to atmosphere through quick release valve 52.

In accordance with the present application, pressure holding valve E is connected between parking brake control valve 46 and the air chambers of parking brakes 60 in order to hold a predetermined pressure of at least 80 psig in the air chambers of parking brakes 60 even though the air pressure in the remainder of the system and in conduit 44 is at operational pressures below 80 psig. However, once the air pressure in the remainder of the system and conduit 44 falls below operational levels, pressure holding valve E operates to dump the air from the air chambers of parking brakes 60.

Pressure holding valve E includes an inlet port 70 communicating with conduit 48 and a delivery port 72 communicating with conduit 50. The body of valve E has a bore between ports 70 and 72 receiving a sleeve member 74 having a bottom end 76 with a plurality of circumferentially-spaced radially extending flutes thereon to define flow channels therebetween. Bottom end 76 is seated on the upper ends of a plurality of circumferentially-spaced axially extending flutes 78 which define axial flow passages therebetween. An outer circumferential seal 80 is positioned between sleeve member 74 and the bore in which it is received. The upper end of sleeve member 74 sealingly engages a gasket 82 located between sleeve member 74 and cap member 84.

Pressure responsive means in the form of a hollow piston 88 is reciprocatingly received in sleeve member 74 and having one end 90 defining a circumferential valve seat cooperating with check valve disc 92 which is reciprocatingly guided within flutes 78 and normally biased away from delivery port 72 toward piston end 90 by biasing means in the form of a coil spring 94. Axially spaced circumferential seals 102 and 104 are provided around piston 88, and the area of piston 88 enclosed by seal 102 is substantially greater than the area of piston 88 enclosed by seal 104. A vent hole 106 extends radially through sleeve member 74 to communicate with the exterior of piston 88 between seals 102 and 104, and an atmospheric vent 108 extends through the body of valve E so that the exterior surface of piston 88 between seals 102 and 104 is at atmospheric pressure.

Pressure holding valve E is generally in the position of FIG. 1 when the system is being charged. Air pressure entering inlet port 70 acts through hollow piston 88 against check valve disc 92 for displacing same away from piston end 90 for flow of air around check valve disc 92 through the spaces between flutes 78 and delivery port 72 to the air chambers of parking brakes 60. Whenever the operational pressure of the brake system and at inlet port 70 is less than the predetermined pressure at delivery port 72, pressure holding valve E will assume the position shown generally in FIG. 2. In this position, the pressure in the air chambers of the parking brakes is greater than the operational pressure acting through inlet port 70. Therefore, the reverse pressure acting on check valve 92 displaces same and piston 88 toward inlet port 70. Pressure holding valve E will prevent reverse flow from the parking brake air chambers back into the system at operational pressures as low as 30 psig. However, when the operational pressure at inlet port 70 falls below around 30 psig, pressure holding valve E assumes the position shown in FIG. 3 wherein communication is established from delivery port 72 to inlet port 70 past check valve 92 by flowing through flutes 78 and flutes on bottom end 76 of sleeve member 74, past piston end 90 and through the interior of hollow piston 88.

Figure 2:
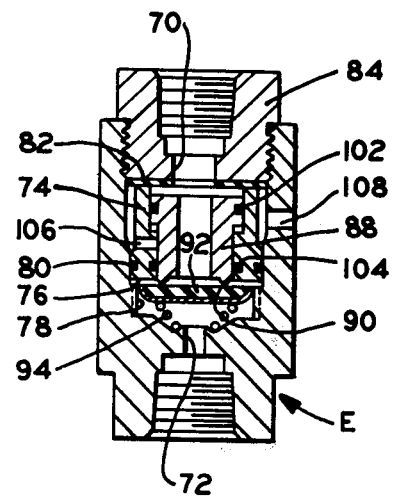
FIG. 2 is a cross-sectional elevational view showing the valve in a different operational mode.

In the valve position of FIG. 2, the pressure acting downwardly on piston 88 is equal to system pressure at inlet port 70 times the difference between the area of piston 88 enclosed within seal 102 and the area enclosed within seat 90. In the position of FIG. 2, this downward force on the piston is equal to the upward force which is the pressure in the air chambers of the parking brakes times the difference between the area of piston 88 enclosed within seal 104 and the area enclosed by seat 90. When this upward force acting on piston 88 exceeds the downward force, piston 88 moves to the position of FIG. 3 so that air can be exhausted from the parking brake air chambers. Pressure holding valve E will assume the position of FIG. 3 when a system failure occurs or by operating parking valve 46 to exhaust conduit 48 to atmosphere so that the pressure acting at inlet port 70 is atmospheric pressure.

Check valve 92 provides flow from inlet port 70 to delivery port 72 when there is a pressure drop from inlet port 70 to delivery port 72. Check valve 92 prevents reverse flow when there is a relatively low pressure drop from delivery port 72 to inlet port 70. When there is a relatively high pressure drop from delivery port 72 to inlet port 70, the pressure responsive means defined by piston 88 moves away from check valve 92 for allowing flow therepast from delivery port 72 to inlet port 70.

Figure 3:
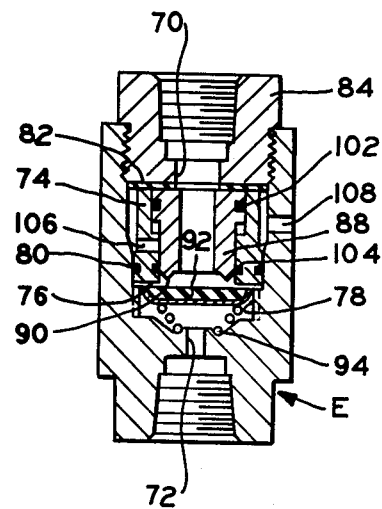
FIG. 3 is a cross-sectional elevational veiw of the pressure holding valve in still another operational mode.
Figure 4:
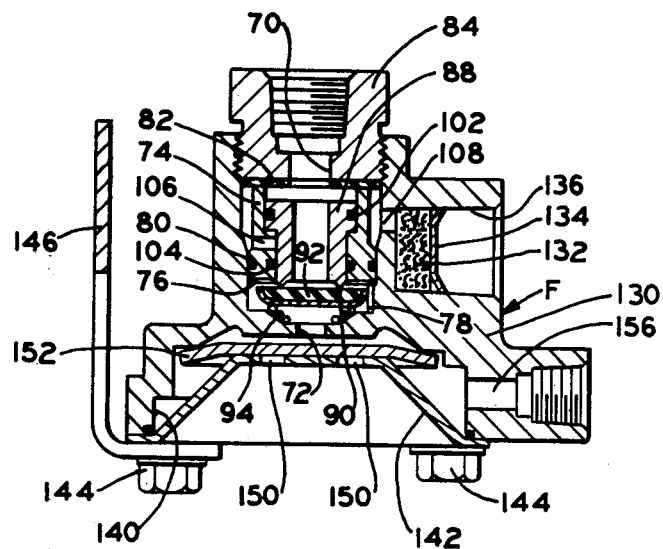
FIG. 4 is a cross-sectional elevational view of a pressure holding valve combined with a quick release valve device.

FIG. 4 shows a pressure holding valve combined with a quick release valve device. The combined valve F of FIG. 4 is a combination of pressure holding valve E of FIG. 1 with quick release valve device 52. In the arrangement of FIG. 4, the pressure holding valve and the quick release valve device are combined in a common one-piece body 130. A filter 132 and filter retainer 134 are positioned in a bore 136 outwardly of atmospheric vent 108 to prevent entry of dirt into the valve through the atmospheric vent port. An enlarged cavity 140 in the base of valves body 130 has a cone-shaped member 142 positioned therein and secured to body 130 as by fasteners 144 which also secure a mounting bracket 146 thereto. Member 142 has atmospheric vent ports 150 therethrough normally closed by a flexible rubber diaphragm 152. An outlet port 156 communicates with cavity 140 between diaphragm 152 and cone member 142. When the air chambers of the parking brakes are being charged, air flows from delivery port 72 past the outer periphery of diaphragm 152 through outlet port 156 which is connected to conduits 54 of FIG. 1 leading to the air chambers of parking brakes 60. When there is a high pressure drop from delivery port 72 to inlet port 70, the pressure holding valve assumes the position in FIG. 3 and there is no longer ay pressure acting downwardly on diaphragm 152 for holding same in engagement with cone member 142 to close atmospheric vent ports 150. Therefore, the back pressure acting through outlet port 156 from the air chambers of the parking brakes displaces diaphragm 152 upwardly in FIG. 4 away from cone member 142 so that the air in the parking brake air chambers is discharged to atmosphere through atmospheric vent ports 150.

It should be recognized that the biasing force provided by the yieldable biasing means defined by spring 94 is a very light biasing force. The biasing force is just sufficient to maintain check valve 92 engaged with piston end 90 or the bottom end of sleeve member 74. The biasing force of spring 94 is insufficient to have any significant effect in holding check valve 92 closed. That is, air flows from inlet port 70 to delivery port 72 with virtually no resistance being provided by spring 94. Thus, air flows through valve E in one direction from inlet port 70 to delivery port 72 whenever the pressure air inlet port 70 is slightly above atmospheric and exceeds the pressure at delivery port 72.

Piston 88 is completely pressure operated for movement between positions shown in FIGS. 1–3 and no spring forces are utilized acting upon the piston. When the pressure holding valve is in the position of FIG. 3, the pressure at delivery port 72 can be exhausted to substantially atmospheric pressure when the pressure at inlet port 70 is substantially atmospheric. This allows substantially complete exhaustion of the air chambers for the parking brakes so that such brakes can be applied with their full force.

Figure 5:
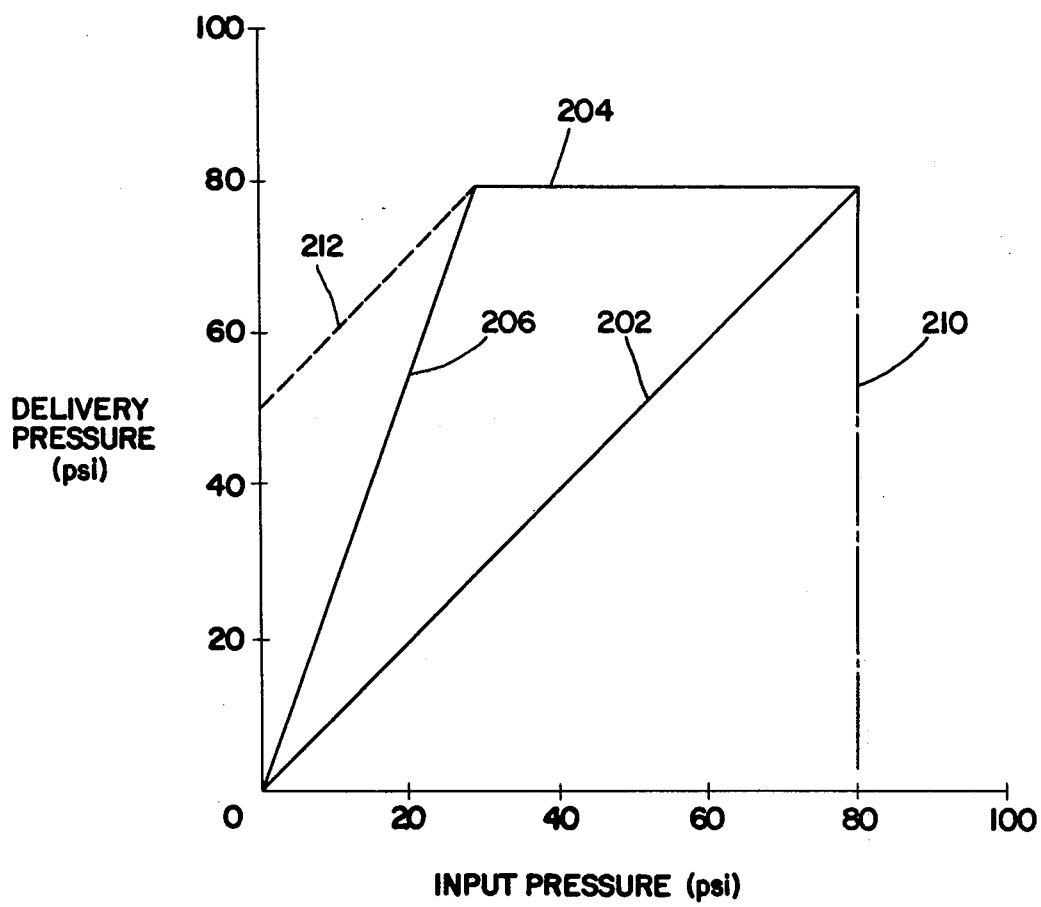
FIG. 5 is a graph showing the operating characteristics of the pressure holding valve of the present application as compared with other valves.

FIG. 5 shows the general operating characteristics of the pressure holding valve of the present application as compared with certain prior valves. Flow through pressure holding valve E from inlet port 70 to outlet port 72 is represented by line 202. It should be noted that this is a straight line relationship and the pressure at the delivery port is approximately equal to the pressure at the inlet port. Line 204 on the graph represents a full charging of the parking brake air chambers. As the operating pressure at inlet port 70 decreases below the predetermined pressure to which the parking brake air chambers are normally charged, check valve 92 prevents air from bleeding back through pressure holding valve E as long as the pressure at inlet port 70 is in the operational pressure range. However, when the pressure at inlet port 70 falls below the operational pressure range, pressure holding valve E moves to the mode shown in FIG. 3 so that reverse flow in an opposite direction occurs as represented by line 206 in FIG. 5. Backflow can occur to completely exhaust the air chambers of the parking brakes to atmospheric pressure when the pressure at inlet port 70 is atmospheric. This is very important in a vehicle brake system in order that the parking brakes can be applied with their full force.

Line 210 in FIG. 5 represents an arrangement provided with a valve of the type disclosed in U.S. Pat. No. 3,439,873 to Relf when such valve is connected to provide normal flow in a direction from port 15 to port 14. The valve in the Relf device includes a powerful spring 7 which normally holds the valve closed. In the direction of flow described, charging of the parking brake air chambers could not occur until the inlet pressure is at a substantial value, shown in FIG. 5 as being approximately 80 psi. Reverse flow would then occur along the same line 210 because there is no opposite check valve to prevent exhaustion in the opposite direction. An arrangement of this type is highly undesirable in vehicle brake systems because it is desirable to begin charging the parking brake air chambers with pressure as soon as the compressor begins operating. Connecting the Relf valve for flow in a direction from port 14 to port 15 would allow charging of parking brake air chambers along the same line 202 as the valve of the present application. However, backflow through the Relf valve in the reverse direction would take place along line 212 of FIG. 5 because the check valve in Relf is spring loaded by spring 7 instead of being pressure operated. Spring loading the check valve with a heavy spring makes it impossible to completely exhaust the parking brake air chambers to atmospheric pressure and this makes it impossible to apply the full force of such brakes.

The improved pressure holding valve of the present application allows completely free flow therethrough in one direction from inlet port 70 to delivery port 72 for all pressures at inlet port 70 above atmospheric pressure and exceeding the pressure at delivery port 72. The valve is completely pressure operated to provide flow in a reverse direction from delivery port 72 to inlet port 70 for completely exhausting the pressure at delivery port 72 to atmospheric pressure when the pressure at inlet port 70 is atmospheric.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A vehicle air brake system including spring set air released parking brakes having parking brake air chambers, air supply means for supplying air to said parking brake air chambers for releasing said parking brakes when said air chambers are at a predetermined pressure, a pressure holding valve interposed between said air supply means and said parking brakes, said pressure holding valve providing free flow therethrough in one direction from said air supply means to said parking brakes at all pressures of said air supply means slightly above atmospheric pressure and above the pressure in said parking brake air chambers, said pressure holding valve normally blocking reverse flow therethrough in an opposite direction for maintaining said parking brake air chambers at said predetermined pressure even though said air supply means falls to operational pressures substantially above atmospheric pressure and substantially below said predetermined pressure, said pressure holding valve being operative to provide reverse flow therethrough in said opposite direction when said air supply means falls below said operational pressures for all pressures of said air supply means slightly below said operational pressures down to atmospheric pressure to exhaust said parking brake air chambers from said predetermined pressure, and said pressure holding valve being operative as aforesaid to exhaust said air chambers to substantially atmospheric pressure when the pressure of said air supply means falls to substantially atmospheric pressure.

2. The air brake system of claim 1 wherein said pressure holding valve includes quick release means for releasing said predetermined pressure from said parking brake air chambers to atmosphere.

3. The air brake system of claim 1 wherein said pressure holding valve includes inlet and delivery ports having a check valve interposed therebetween for normally providing flow from said inlet port to said delivery port and blocking reverse flow, and movable pressure responsive means between said inlet and delivery ports for providing flow past said check valve from said delivery port to said inlet port when said air supply means falls below said operational pressures while said air chambers are above said operational pressures.

4. The air brake system of claim 3 wherein said pressure responsive means comprises a hollow piston having one end normally engaging said check valve and said check valve is yieldably biased against said one end by yieldable biasing means having a very light biasing force which provides virtually no resistance to flow through said pressure holding valve from said inlet port to said delivery port, and said piston being responsive to lowering of said air supply means below said operational pressures for moving away from said check valve and providing flow from said delivery port to said inlet port.

5. The air brake system of claim 4 including quick release means associated with said pressure holding valve for releasing said predetermined pressure from said parking brakes to atmosphere, said quick release means including an atmospheric vent port normally closed by a diaphragm past which air is delivered from said delivery port to said parking brakes, and said diaphragm being unseated from said atmospheric vent port to provide flow from said parking brake air chambers to atmosphere when said piston moves to establish flow from said delivery port to said inlet port.

6. A pressure holding valve having inlet and delivery ports, a single check valve between said ports for normally providing flow directly therepast in one direction from said inlet port to said delivery port for all pressures at said inlet port slightly above atmospheric pressure and above the pressure at said delivery port, said check valve normally blocking reverse flow in an opposite direction from said delivery port to said inlet port at relatively low pressure drops from said delivery port to said inlet port when said inlet port is at operational pressures substantially above atmospheric pressure and the pressure at said delivery port exceeds the pressure at said inlet port, movable pressure responsive means operable solely by pressure differentials in the absence of springs for movement in response to a relatively high pressure drop from said delivery port to said inlet port upon lowering of the pressure at said inlet port below said operational pressures for providing flow directly past said check valve in said opposite direction, and said pressure responsive means being operative as aforesaid to provide reverse flow in said opposite direction for reducing the pressure at said delivery port to atmospheric pressure when the pressure at said inlet port is atmospheric.

7. A vehicle air brake system including spring set air released parking brakes, air supply means for supplying air at a predetermined pressure to said parking brakes for releasing same, a pressure holding valve interposed between said air supply means and said parking brakes for maintaining air in said parking brakes at said predetermined pressure when said air supply means falls to operational pressures above atmospheric pressure and below said predetermined pressure, said pressure holding valve being operative to exhaust said predetermined pressure from said parking brakes when said air supply means falls below said operational pressures, said pressure holding valve having air inlet and delivery ports, said pressure holding valve being operative to provide flow therethrough along a flow path from said inlet port to said delivery port when there is a pressure drop from said inlet port to said delivery port for all pressures at said inlet port from slightly above atmospheric pressure, said pressure holding valve being operative to block flow therethrough from said delivery port to said inlet port when there is a relatively low pressure drop from said delivery port to said inlet port and the pressure at said inlet port is above said operational pressures, said pressure holding valve being operative to provide flow therethrough in an opposite direction along said flow path from said delivery port to said inlet port when there is a relatively high pressure drop from said delivery port to said inlet port and said inlet port is at a pressure below said operational pressure, and said pressure holding valve being operative as aforesaid to provide flow therethrough in said opposite direction to exhaust the pressure at said delivery port to substantially atmospheric pressure when the pressure at said inlet port is substantially atmospheric.

* * * * *